(12) United States Patent
Hartvigsen et al.

(10) Patent No.: US 8,940,151 B1
(45) Date of Patent: Jan. 27, 2015

(54) WATER ELECTROLYSIS SYSTEMS AND METHODS

(71) Applicant: Advanced Hydrogen Products, LLC, Provo, UT (US)

(72) Inventors: Jeremy L. Hartvigsen, Provo, UT (US); Aaron J. Hartvigsen, Bow, WA (US); Andrew J. Hartvigsen, Provo, UT (US)

(73) Assignee: Advanced Hydrogen Products, LLC, Provo, UT (US)

( * ) Notice: Subject to any disclaimer, the term of this patent is extended or adjusted under 35 U.S.C. 154(b) by 257 days.

(21) Appl. No.: 13/663,128

(22) Filed: Oct. 29, 2012

Related U.S. Application Data

(60) Provisional application No. 61/553,755, filed on Oct. 31, 2011.

(51) Int. Cl.
*C25B 1/04* (2006.01)

(52) U.S. Cl.
USPC ........ 205/628; 205/633; 205/637; 204/275.1; 204/278

(58) Field of Classification Search
USPC ........ 205/628, 630, 633, 637; 204/275.1, 278
See application file for complete search history.

(56) References Cited

U.S. PATENT DOCUMENTS

| | | | |
|---|---|---|---|
| 3,790,464 A | 2/1974 | Greaves | |
| 3,846,274 A | 11/1974 | Gifford | |
| 4,627,899 A | 12/1986 | Smith et al. | |
| 5,474,662 A | 12/1995 | Miyamae | |
| 5,534,120 A | 7/1996 | Ando et al. | |
| 5,843,291 A | 12/1998 | Eki et al. | |
| 5,846,390 A | 12/1998 | Eki et al. | |
| 5,853,562 A | 12/1998 | Eki et al. | |
| 5,865,966 A | 2/1999 | Watanabe et al. | |
| 7,048,842 B2 | 5/2006 | Tremblay et al. | |
| 7,566,387 B2 | 7/2009 | Nam et al. | |
| 7,635,530 B2 | 12/2009 | Kenis et al. | |
| 7,651,602 B2 * | 1/2010 | Helmke et al. | 205/412 |
| 2003/0042134 A1 | 3/2003 | Tremblay et al. | |

(Continued)

FOREIGN PATENT DOCUMENTS

JP 56025979 3/1981

OTHER PUBLICATIONS

Burke et al. "Development of a membrane-less dynamic field gradient focusing device for the separation of low-molecular-weight molecules" *Electrophoresis*. Mar. 2010, 31(5), pp. 902-909.

(Continued)

*Primary Examiner* — Arun S Phasge
(74) *Attorney, Agent, or Firm* — Workman Nydegger

(57) ABSTRACT

Membrane-less electrolysis systems including an electrolysis chamber having an inlet for water, a cathode associated with the electrolysis chamber that includes a plurality of apertures within the cathode that fluidly couple the chamber with a cathode fluid pathway that is fluidly coupled to a hydrogen gas collector, an anode associated with the electrolysis chamber that similarly includes a plurality of apertures fluidly coupling the chamber with an anode fluid pathway that is fluidly coupled to an oxygen gas collector, a power source electrically coupled to the cathode and anode, and a pump fluidly coupled with the water reservoir and electrolysis chamber so that the pump is configured to pump water into the electrolysis chamber, through the cathode and anode apertures, into the cathode and anode fluid pathways, respectively, and into the product gas collectors.

36 Claims, 8 Drawing Sheets

(56) References Cited

U.S. PATENT DOCUMENTS

2007/0170070 A1    7/2007    Uno et al.
2008/0041717 A1    2/2008    Tremblay et al.

OTHER PUBLICATIONS

Jorquera et al. "Disinfection of seawater for hatchery aquaculture systems using electrolytic water treatment", *Aquaculture*, 2002, 207, pp. 213-224.

\* cited by examiner

WATER ELECTROLYSIS SYSTEMS AND METHODS

CROSS-REFERENCE TO RELATED APPLICATIONS

The present application claims the benefit of U.S. Patent Application Ser. No. 61/553,755, filed Oct. 31, 2011, entitled "WATER ELECTROLYSIS SYSTEMS AND METHODS", the disclosure of which is incorporated by reference in its entirety.

BACKGROUND OF THE INVENTION

1. The Field of the Invention

The present invention is in the field of systems and methods for water electrolysis.

2. The Relevant Technology

Energy consumption in the United States and throughout the world continues to drive interest in sources of energy that are cost competitive and have limited environmental impact. Hydrogen is one energy source that has been considered as a possibility for use as a replacement to fossil fuels such as oil and natural gas. One method by which hydrogen can be generated is through electrolysis of water, splitting the water into separate hydrogen and oxygen components.

One difficulty with existing systems and methods of hydrogen generation through electrolysis is that cost and efficiency have not been particularly competitive relative to more traditional, developed sources of energy. As such, there continues to be a need for improved systems and methods of generating hydrogen gas through electrolysis.

SUMMARY

The present invention is directed to systems for producing gaseous products from liquid reaction materials, particularly water electrolysis systems. Such a system may include an electrolysis chamber including an inlet for the liquid reactant (e.g., water) that may be coupled to a reservoir (e.g., a water reservoir). The system includes a cathode associated with the electrolysis chamber that includes a plurality of apertures within the cathode that fluidly couple the chamber with a cathode fluid pathway that is fluidly coupled to a products gas collector (e.g., a hydrogen gas collector). The system also includes an anode associated with the electrolysis chamber that similarly includes a plurality of apertures fluidly coupling the chamber with an anode fluid pathway that is fluidly coupled to another products gas collector (e.g., an oxygen gas collector). A power source may be electrically coupled to the cathode and anode, and a pump may be fluidly coupled with the water reservoir and electrolysis chamber so that the pump is configured to pump water or other reactant through the water reservoir, through the cathode and anode apertures where electrolysis may occur, and resulting products may be pumped into the cathode and anode fluid pathways, respectively, and into the product gas collectors.

Many existing electrolysis systems rely on the presence of a gas separation membrane. The main obstacles to increased efficiency in water electrolysis systems are electrical resistances resulting from gas bubbles, from the gas separation membrane, and from the electrolyte. The gas bubbles obscure the electrode, and restrict the free path available for current, increasing the overall circuit resistance. The electrolyte and the membrane also have significantly higher resistance than the electrically conductive metal structures used in the system. By reducing and avoiding these major sources of resistance, efficiency of the resulting system can be significantly increased.

The presently disclosed electrode configurations are designed to provide the above described increases in efficiency. By allowing flow through the electrode and into a cavity within the electrode, such that flow continues to a product separator, both the membrane included in typical electrolysis systems and resistances due to bubble adherence and bubble evolution at the electrode surface can be significantly reduced or eliminated. In addition, by eliminating the need for a membrane, the distance between the electrodes can be reduced as compared to requirements where a membrane is present, which further reduces the total resistance by reducing the resistance associated with the electrolyte path. As a result, the vast majority of the electrolyzer circuit is made up of highly conductive materials (e.g., metals), as opposed to the electrolyte solution (e.g., a basic or acidic aqueous solution). Another benefit of membrane elimination is this component often requires the most maintenance and has the highest cost of all the components of existing electrolyzer systems.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by references to specific embodiments thereof, which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 3AA is an elevation end view of an electrode similar to that of FIG. 3A, but including apertures or pores at a distal end, away from a water inlet;

DETAILED DESCRIPTION OF THE PREFERRED EMBODIMENTS

I. Introduction

Figure 1:
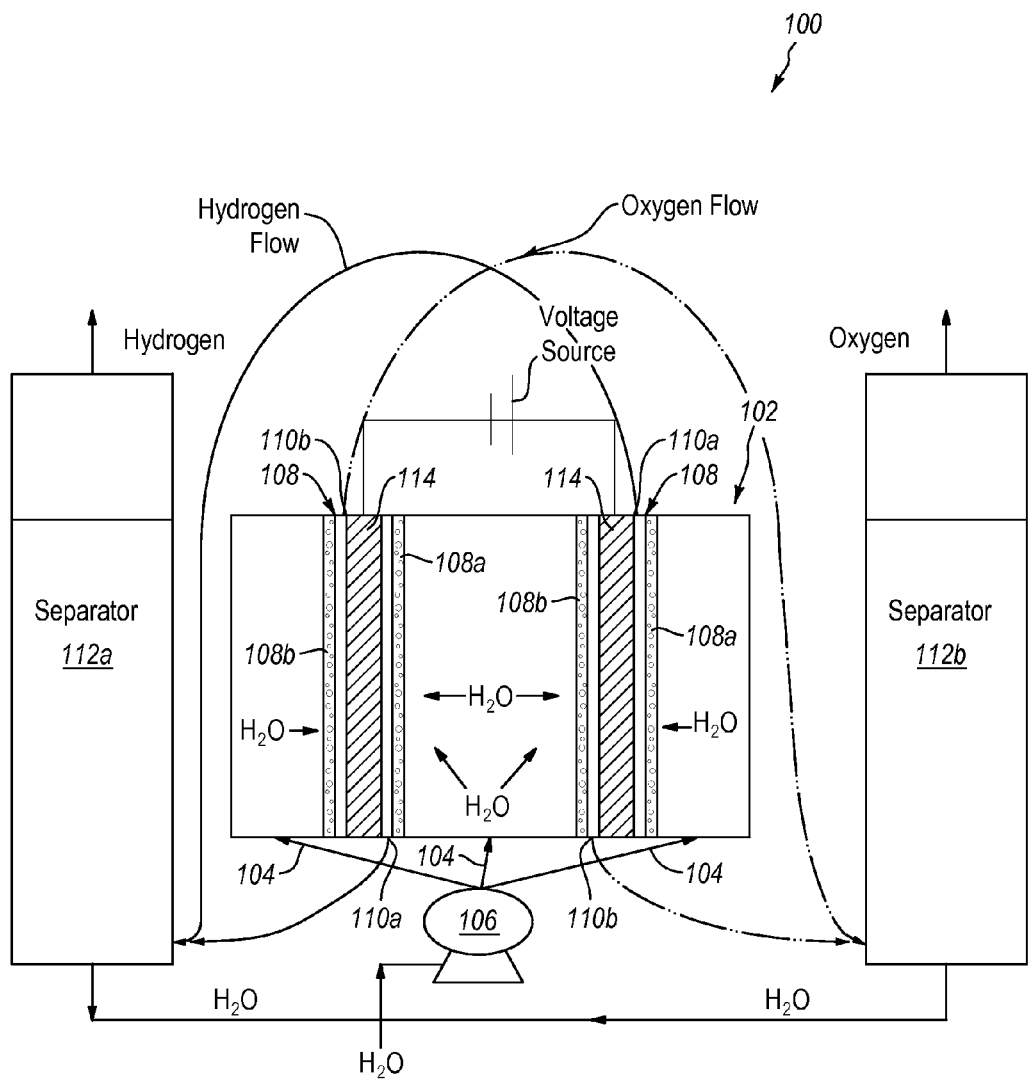
FIG. 1 is a schematic view of an exemplary electrolysis system according to the present invention.

The present invention is directed to systems for producing gaseous products from liquid reaction materials, particularly water electrolysis systems. Such a system may include an electrolysis chamber including an inlet for the liquid reactant (e.g., water) that may be coupled to a reservoir (e.g., a water reservoir). The system includes a cathode associated with the electrolysis chamber that includes a plurality of apertures within the cathode that fluidly couple the chamber with a cathode fluid pathway that is fluidly coupled to a products gas collector (e.g., a hydrogen gas collector). The system also includes an anode associated with the electrolysis chamber that similarly includes a plurality of apertures fluidly coupling the chamber with an anode fluid pathway that is fluidly coupled to another products gas collector (e.g., an oxygen gas collector). A power source may be electrically coupled to the cathode and anode, and a pump may be fluidly coupled with the water reservoir and electrolysis chamber so that the pump is configured to pump water or other reactant through the water reservoir, into the cathode and anode apertures where electrolysis may occur, and the resulting product gases are pumped into the cathode and anode fluid pathways, respectively, and into the product gas collectors.

One problem with renewable energy resources such as wind and solar energy is their limited ability to support traditional electrical markets. For example, in sunny climates, solar power is very predictable, but rated production is available at most less than half the day. Even at the best sites, wind is highly variable and tends to produce more at night when energy demand is low. The variability of wind limits wind power to no more than about 15% of the generation mix in order to ensure grid stability. Gas-fired turbines are often used to back wind generated electricity. This solution is costly and inefficient, negating most of the value of the wind resource.

Furthermore, locations having good wind or solar resources where the land is relatively inexpensive tend to be remote and not well supported by existing transmission lines. Permitting and routing of transmission lines through communities that may have little to gain by the project is generally costly and contentious. Transmission bottlenecks and grid stability concerns lead to frequent curtailment of wind generation capacity. For example, it is not unheard of for wind power in Texas and Denmark to fetch a negative price, that is, the wind power owner pays other generators to cut production in order to allow the grid to sink power from wind turbines. Often a utility's investment in wind power is motivated more by public relations, potential tax credits, and the sale of renewable power credits than for any energy derived from the investment.

Storing energy produced during off-peak demand times is a problem. One approach would be to use such off-peak produced energy to produce hydrogen, which can be used as a low/no greenhouse gas emission transportation fuel, used to power a hydrogen fed electricity generating turbine for peak-time energy consumption, or other purposes. The present inventive electrolysis systems provide for significantly improved efficiency of hydrogen production, dropping the cost of hydrogen ($/kg) generated through electrolysis significantly. In one embodiment, such electrolysis systems could be used to store excess energy produced (e.g., from renewable sources such as wind and/or solar) during off-peak demand periods in the form of chemical bonds (e.g., H—H), which fuel can be used later as a transportation fuel, for generation of electricity at peak demand periods, or for other purposes. Oxygen gas generated through such an electrolysis system also represents a value added product that of course could be used or sold.

Many existing electrolysis systems rely on the presence of a gas separation membrane. The main obstacles to increased efficiency in water electrolysis systems are electrical resistances resulting from gas bubbles, from the gas separation membrane, and from the electrolyte. The gas bubbles obscure the electrode (e.g., see FIG. 4A), and restrict the free path available for current, increasing the overall circuit resistance. The electrolyte and the membrane also have significantly higher resistance than the electrically conductive metal structures used in the system. By reducing and avoiding these major sources of resistance, efficiency of the resulting system can be significantly increased.

The presently disclosed electrode configurations are designed to provide the above described increases in efficiency. By allowing flow through the porous electrode and into a cavity or flow channel within the electrode, such that flow continues to a product separator, the membrane included in typical electrolysis systems can be eliminated and resistances due to bubble adherence and bubble evolution at the electrode surface can be significantly reduced. In addition, by eliminating the need for a membrane, the distance between the electrodes can be reduced as compared to requirements where a membrane is present, which further reduces the total resistance by reducing the resistance associated with the electrolyte path. As a result, the vast majority of the electrolyzer circuit is made up of highly conductive materials (e.g., metals), as opposed to the electrolyte solution (e.g., a basic or acidic aqueous solution). Another benefit of membrane elimination is this component often requires the most maintenance and has the highest cost of all the components of existing systems.

Exemplary electrolytes include, but are not limited to those currently used in electrolysis cells. Acidic solutions, basic solutions, or substantially basic solutions including electrically conductive electrolytes may be employed. Examples of suitable basic electrolytes that may be used include alkali and alkaline metal earth hydroxides (e.g., potassium hydroxide).

FIG. 1 is a schematic view of an exemplary system 100 including an electrolysis chamber 102. Water or other liquid to be electrolyzed is provided through inlets 104, with the assistance from pump 106. Water or other liquid may be provided from a water reservoir, or continuous source. For simplicity, the term water reservoir broadly refers to such various possible configurations. As shown, each electrode 108 is porous so as to include a plurality of apertures or pores. Each electrode may be bi-polar, including a hydrogen generating side cathode 108a and an oxygen generating side anode 108b. Each electrode 108 may be configured as a bi-polar plate. Each electrode 108 includes a fluid flow pathway (e.g., a flow channel) within the interior of the electrode structure away from the exterior surface of the electrode. A fluid flow path 110a is included on the hydrogen generating side 108a and another flow path 110b is provided on the oxygen generating side 108b, where the respective flow pathway receives the fluid flow from water into the pores or apertures and has an outlet fluidly coupled to a corresponding separator 112a, 112b. This allows for water to flow through the pores or apertures and into the corresponding fluid flow path, and the water will carry the generated oxygen or hydrogen, depending on the side of the electrode. Hydrogen and water can be collected from side 108a of electrode 108, and the water can be separated from the hydrogen product in separator 112a. Water may then be recycled back through pump 106 for electrolysis. On the other side 108b of bi-polar electrode 108, a mixture of oxygen and water can be collected, and the water may be separated from the oxygen in separator 112b and recycled back through pump 106 for electrolysis.

FIGS. 2A-3A show a more detailed exemplary configuration of a possible porous electrode 108 including pores or apertures on sides 108a, 108b. FIG. 3B shows a view similar to that of FIG. 3A, but in which the flow of water (designated by arrows) is shown on one side of the bi-polar plate 108 for one of the product gases (e.g., either hydrogen or oxygen). As shown, water is able to pass through the pores or apertures in the electrode side 108b and then through the corresponding fluid path 110b within electrode 108. Reactant water enters pores of electrode side 108b (i.e., the anode) on the exterior of the electrode 108, passing into the interior of electrode 108 to product fluid pathway 110b, where it then flows out of electrode 108 for collection and separation of purified product. Flow along electrode side 108a (i.e., the cathode) may be similarly configured, although generating hydrogen gas. Generation of the hydrogen and oxygen products may occur at the electrically charged surfaces within porous anode and porous cathode 108b, 108a, respectively of electrode 108, and product gases are quickly drawn away through the pores or apertures and into the corresponding fluid pathway 110a, 110b of electrode 108. While flow arrows are only shown on anode side 108b of electrode 108 of FIG. 3B, it will be understood that flow also occurs on the opposite cathode side 108a of bi-polar plate electrode 108, where the other product gas is generated and collected. Electrolysis occurs while the water travels through the aperture or pore and into the product fluid pathway 110a, 110b, so that material within the product fluid flow path 110a, 110b includes a mix of water and the respective product gas (i.e., hydrogen or oxygen).

Figure 3A:
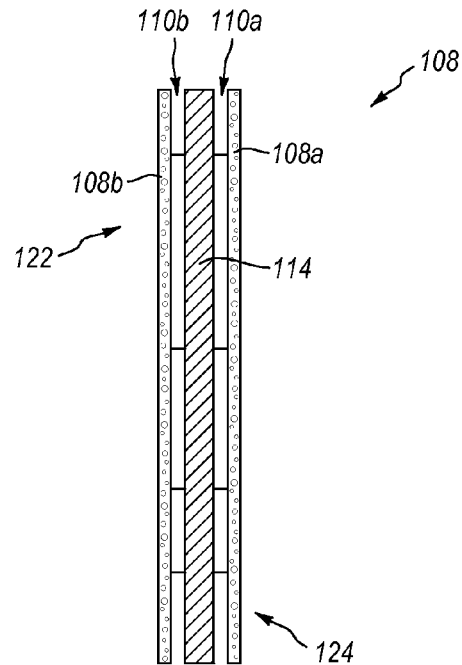
FIG. 3A is an elevation end view of the electrode of FIG. 2A.

FIG. 3AA shows a configuration similar to FIG. 3A, but in which the pores or apertures of the cathode 108a and anode 108b are disposed at a distal end of the cathode 108a and/or anode 108b, away from the water inlet (e.g., adjacent bottom end 124).

As seen in FIGS. 2A-3B, fluid may enter and exit on opposite faces of the electrode surface (e.g., water enters at exterior surface along anode 108b, and exits from interior fluid flow pathway 110b). In addition, the fluid may enter and exit generally along the same axis as electrical current flow. No membrane is required in order to separate oxygen and hydrogen gaseous products. Gases are separated by an electrically conducting plate 114, not ionically with the aid of a membrane. An electrically conductive path is provided through electrode 108 from one surface defining the side of the fluid flow path (e.g., 110b) to the other surface defining the other side of the fluid flow path (e.g., 110b), so that electrical conduction is not required to be through the electrolyte solution (and the generated gas bubbles). This is possible because the pores or apertures allow a hard metal electrically conductive connection to be made (e.g., through jumpers 116).

The system 100 eliminates the need for a membrane as fluid flow takes the generated gas bubbles through the fluid paths 110a, 110b into separators 112a, 112b. The fluid flow also decreases the amount of bubbles in the ion conducting path because as the bubbles are formed, they are removed by the flow of water into the fluid flow path (e.g., 110a, 110b) and downstream to the separators 112a, 112b. This process increases the efficiency and capacity of the individual electrodes and the electrolysis system as a whole (e.g., systems including multiple electrodes in series or parallel for increased product generation or purity).

For example, in one embodiment, multiple bi-polar electrode plates may be situated together in a given electrolysis chamber. Such a system may include mono-polar plates on either end (e.g., a cathode at one end, and an anode at the opposite end) of such a series of bi-polar plates.

Figure 4A:
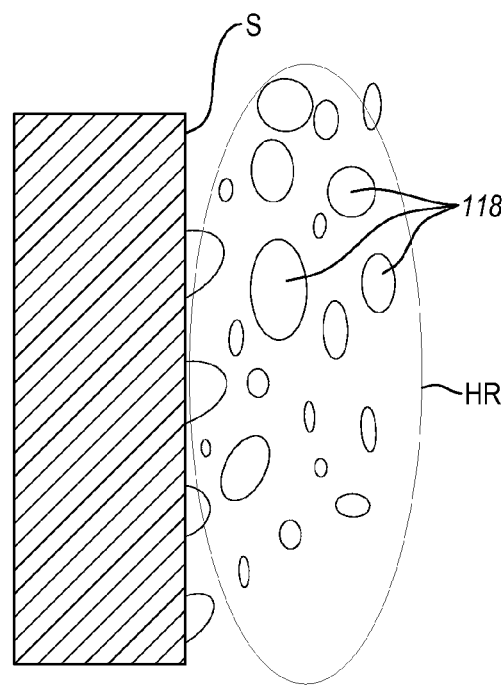
FIG. 4A is a schematic view showing how an area of high resistance forms adjacent to state of the art electrode surfaces as a result of the formation of bubbles of electrolysis products.
Figure 4B:
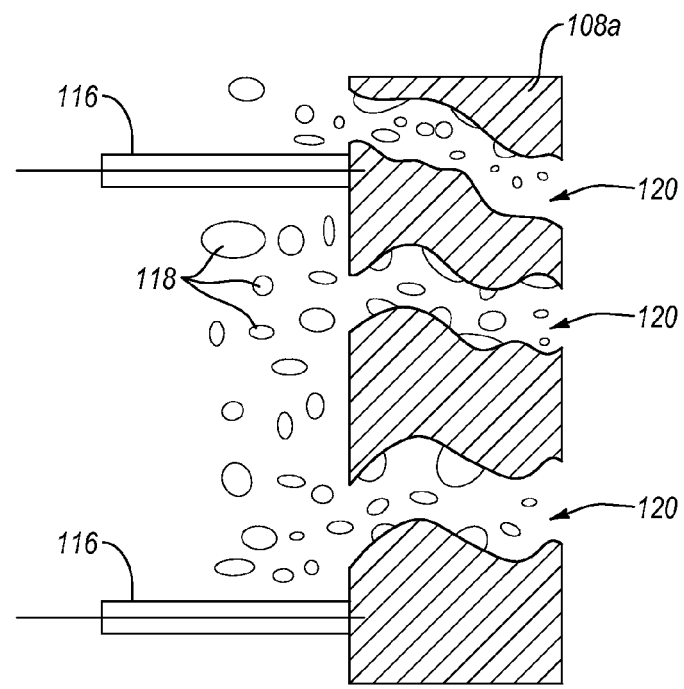
FIG. 4B is a schematic view showing how the presently contemplated electrode configuration significantly reduces or eliminates the formation of a high resistance area adjacent the electrode surface.

FIG. 4A shows how traditionally configured electrodes result in the formation of gas bubbles 118 adjacent the electrode surface S, which results in an area of high electrical resistance HR adjacent the electrode surface. Such systems may rely on the formation of an electrical circuit through the electrolyte from one electrode to the other (not shown). The resistance caused by such bubbles, as well as the resistance associated with a large distance of electrolyte separating the electrodes can be responsible for the majority of electrical resistance associated with the circuit. As shown in FIG. 4B, the presently contemplated electrodes 108 provide pores or apertures 120 through the electrode 108b, reducing the formation of bubbles that would provide electrical resistance due to their location. In addition, the distance of the electrical circuit going through the electrolyte solution is significantly smaller, so that the vast majority of the circuit (e.g., substantially all) is hard wired through the metal structures of the electrode.

Figure 5:
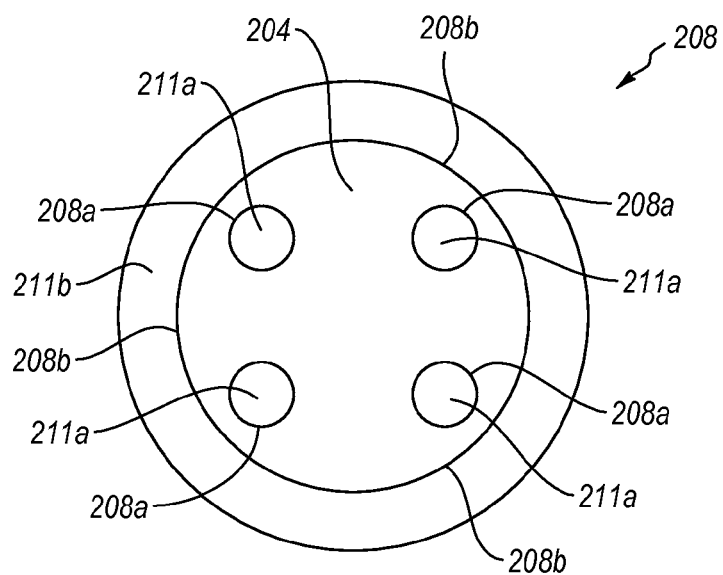
FIG. 5 is a transverse cross-sectional view through another exemplary electrode that may be used in an electrolysis system according to the present invention.

FIG. 5 illustrates an alternative electrode configuration 208 including a single inlet 204 (e.g., for water), and two types of outlets 211a, 211b. The boundary 208a, 208b between the inlet 204 and the respective outlets 211a, 211b is porous so as to include pores or apertures through which the water can enter, generation of the gaseous products can occur, and one gaseous product (e.g., hydrogen) can be withdrawn from one type of outlet (e.g., 211a), while the other gaseous product (e.g., oxygen) can be withdrawn from the other type of outlet 210b. It will be readily apparent that five outlets are actually shown, including a relatively large perimeter outlet (one class), with four smaller outlets (another class) centrally disposed within the central inlet. Electrolysis may occur at the boundary between the inlet 204 and outlets 211a, 211b, and within the pores or apertures leading from the inlet 204 to the respective outlet. Hydrogen may be drawn off through small central outlets 211a, while oxygen may be drawn off through the single large perimeter outlet 211b. In another embodiment, assignments of the outlets relative to the hydrogen and oxygen products may be reversed (e.g., by changing the polarity of the electrodes 208a, 208b).

Figure 6:
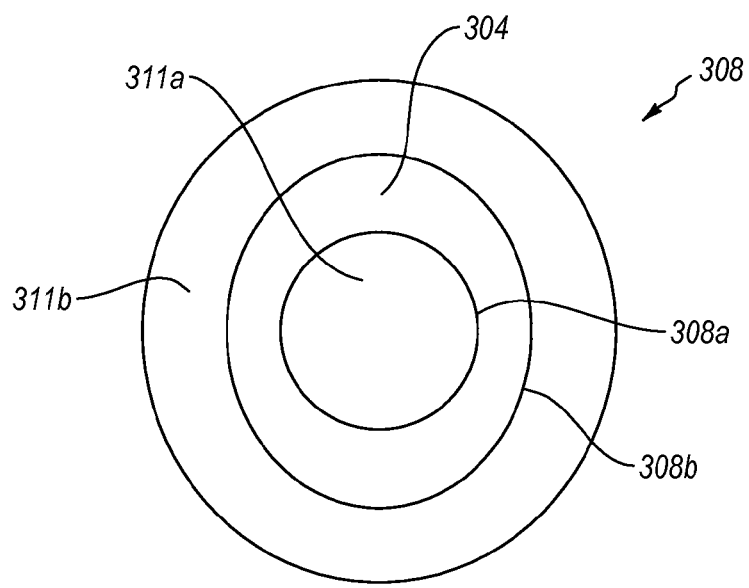
FIG. 6 is a transverse cross-sectional view through another exemplary electrode that may be used in an electrolysis system according to the present invention.

FIG. 6 illustrates another similar configuration 308 including an inlet 304 and two outlets 311a, 311b in which the inlet 304 is sandwiched between an outlet 311a at the center of the system and another outlet 311b is provided at the perimeter of the system. The location of gaseous products may be similar to as described above with respect to FIG. 5. The boundaries 308a, 308b between inlet 304 and the outlets 311a, 311b are similarly porous, including pores or apertures through which the water and generated gaseous products may flow from the inlet 304, across the electrodes 308a, 308b through pores or apertures, and into a corresponding product fluid pathway outlet 311a, 311b.

Figure 7:
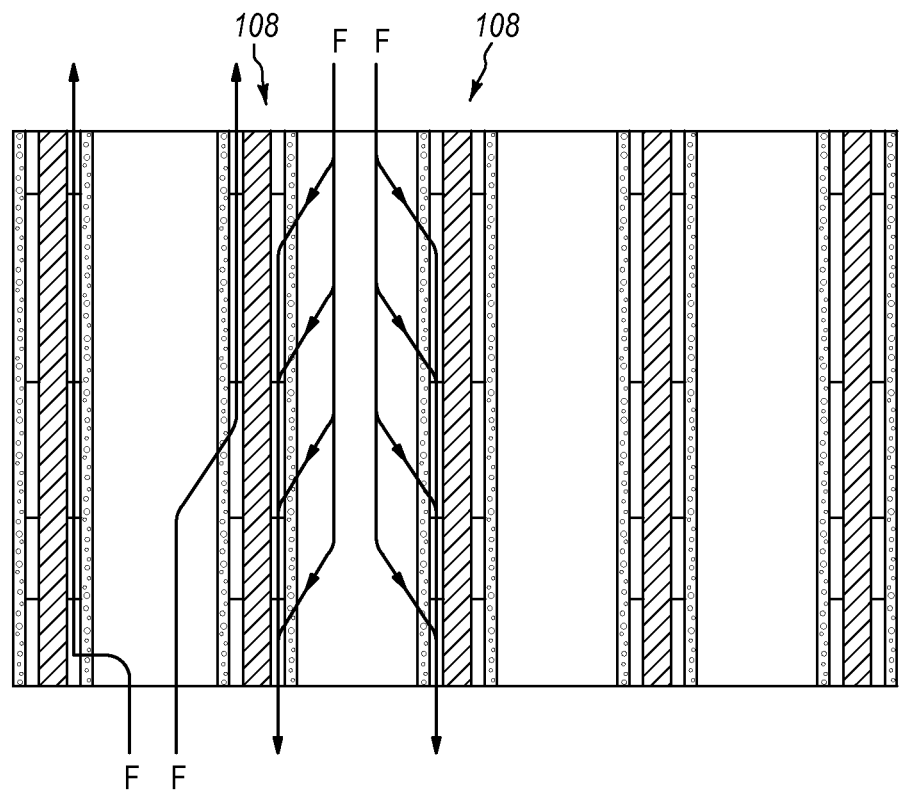
FIG. 7 is a schematic view of an exemplary co-current flow configuration through an exemplary electrode.
Figure 8:
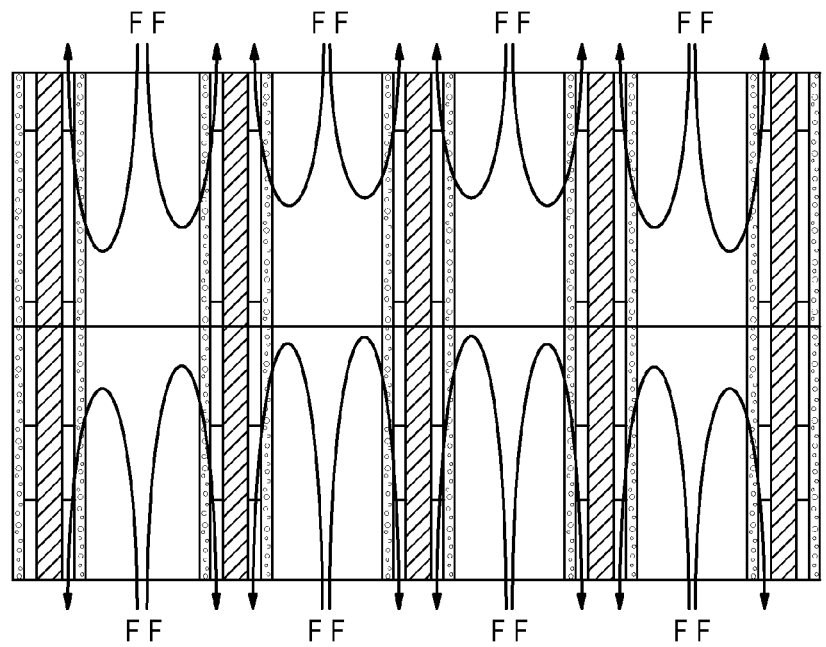
FIG. 8 is a schematic view of an exemplary counter-current flow configuration through an exemplary electrode.
Figure 9:
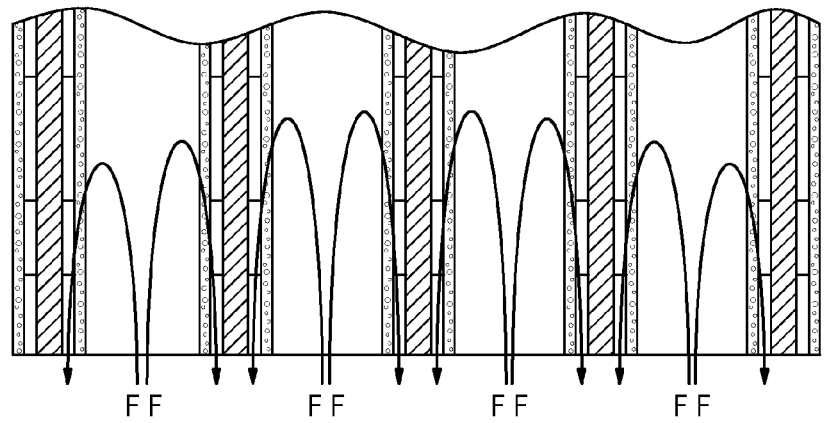
FIG. 9 is a schematic view of another exemplary counter-current flow configuration through an exemplary electrode.

FIGS. 7-9 shows various flow configurations in which flow F may be co-current, cross-current, counter-current, and/or may be present on one or both ends of the bipolar plate (see FIGS. 8-9). Other electrode configurations (e.g., FIGS. 1, 2, 3, 5, 6) may similar be operated in any desired flow configuration (co-current, cross-current, or counter-current).

Figure 2A:
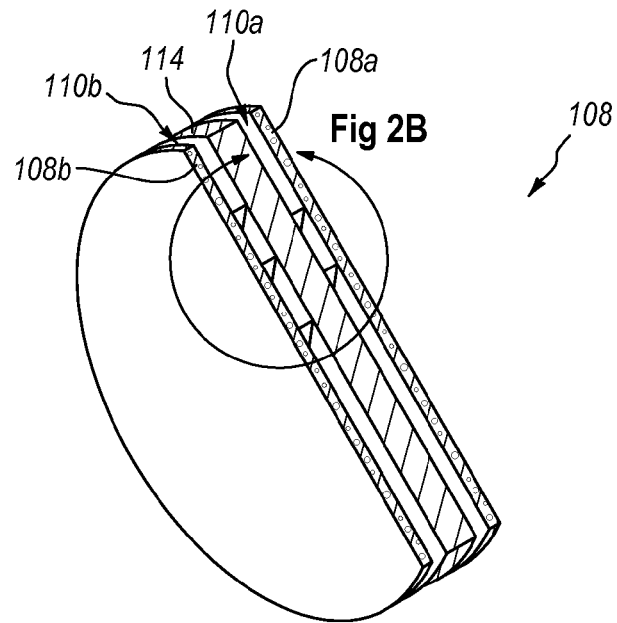
FIG. 2A is a perspective view of an exemplary electrode including a plurality of apertures for use in an electrolysis system according to the present invention.
Figure 2B:
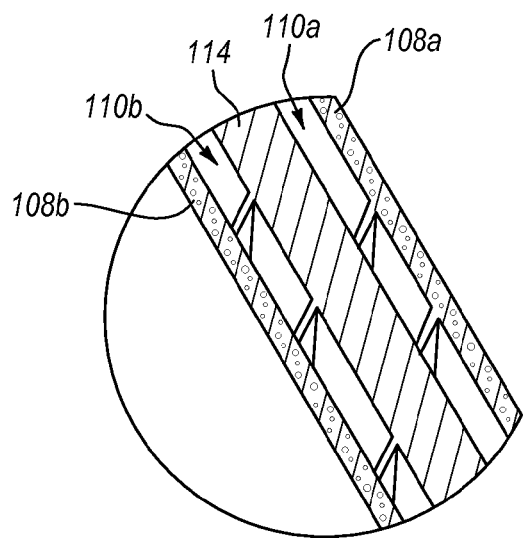
FIG. 2B is a close up perspective view of the electrode of FIG. 2A.
Figure 3A:
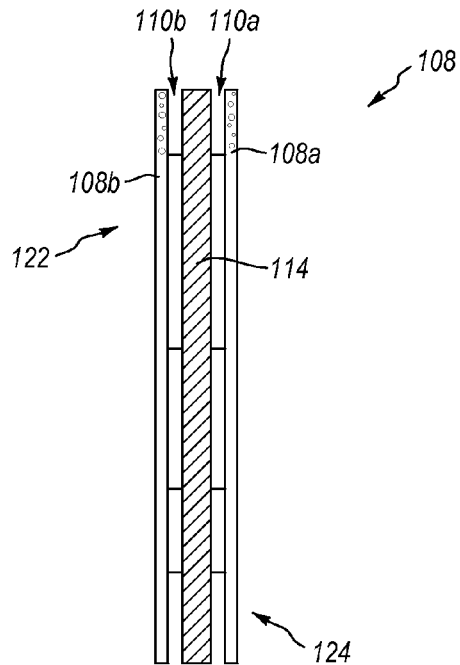
Figure 3B:
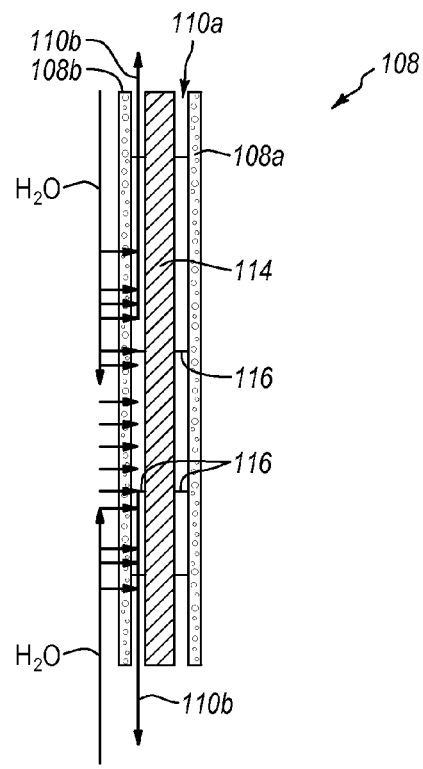
FIG. 3B is a schematic view of the electrode of FIG. 3A, showing in arrows the path of the water and the electrolysis products through the electrode.
Figure 10:
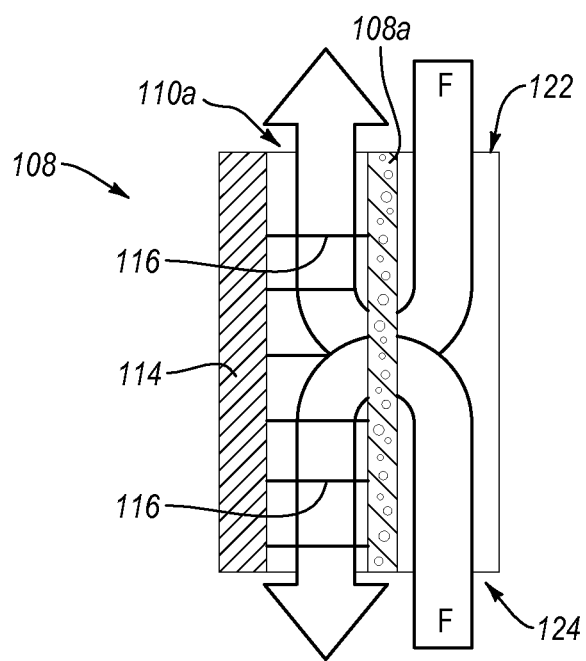
FIG. 10 is a schematic close up view of another exemplary counter-current flow configuration through an exemplary electrode.

FIG. 10 illustrates a close up view of a counter-current configuration in which water enters from the top 122 and bottom 124, flows through pores or apertures in the bi-polar electrode plate 108, (e.g., configured as shown in FIGS. 2-3), and then exits in a counter-current flow path 110a substantially opposite from the adjacent entry path. In other words, where water enters from the top 122, it (and product gases) exits also from the top 122, flowing in an opposite direction. Only one half (i.e., a mono-polar plate) of the bi-polar electrode plate is seen in FIG. 10, showing the exit pathway of one of the product gases (e.g., hydrogen product). It will be understood that a mirror image structure may be present on the opposite side of plate 114 so that the other side of the electrode 108 has a similar structure and generates the other of the product gases (e.g., oxygen).

The porous cathode and anode may include any suitable configuration of pores or apertures (e.g., holes, slats, honeycomb structure, etc.). In one embodiment, the pores or apertures may be provided as a network of pores within the cathode or anode structure (e.g., a porous material). The pores or apertures may have an average diameter from about 0.00001 mm to about 3 mm, or between about 0.1 mm to about 250 mm, depending on the scale of use contemplated for the system. Very small pores may be formed through chemical etching or other chemical techniques to provide a substrate that is porous, including a network of pores formed therein, rather than forming individual apertures through machining or other manufacturing technique. Such a substrate may be superficially similar to a catalyst porous solid support (e.g., formed of ceramic) used in chemical processing. Larger pores or apertures may be formed by machining (e.g., cutting or drilling holes) or micro-machining. The cathode or anode may comprise a metallic electrically conductive material.

The pores or apertures may be provided along substantially an entire length of the cathode, anode, or both. In another embodiment, the pores or apertures may be located at a distal end of the cathode and/or anode, away from the water inlet (e.g., FIG. 3AA). The apertures or pores may be constant in diameter, or may vary in size. In one embodiment, they may narrow from the electrolysis chamber to the cathode or anode fluid pathway.

The water pump may be configured to pump the reactant water at a substantially constant flow rate, at a variable flow rate (e.g., on demand or preset), or in a pulsating pattern (e.g., high flow, low flow, high flow, low flow, etc.). Pulsed operation may aid in overcoming surface tension effects. The pump(s) may be positioned upstream or downstream respectively, of the electrolysis chamber so as to push or pull the water through the chamber, through the apertures, and through the cathode and anode fluid pathways respectively.

The cathode and anode may be substantially parallel to one another, as shown in various of the illustrated configurations. The cathode and anode may have any suitable dimensions. Length may be between about 1 cm and about 10 cm, or between about 1 cm and about 1.5 cm. Separation between cathode and anode may provide an electrolytic distance of between about 0.1 mm and about 15 cm, or between about 0.5 mm and about 2 cm. The system may be configured to operate under zero gravity, or independent of the orientation of the system with respect to gravity (e.g., it could be operated "sideways" or "upside down") relative to orientations shown in the drawings.

The product fluid pathway (e.g., 110a, 110b) within the cathode and anode may have a cross-sectional width that is between about 0.1 mm and about 5 cm, or between about 2 cm and about 3 cm.

The cavity between the electrodes (e.g., the electrolysis chamber) may be agitated or mixed (e.g., with a shaft driven stifling device, through guide vanes that initiate mixing of incoming fluids, through a magnetic stir bar and associated magnetic field, or other technique).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An electrolysis system, comprising:
    an electrolysis chamber having an electrolysis fluid inlet fluidly coupled to an electrolysis fluid reservoir;
    a cathode associated with the electrolysis chamber and having a plurality of apertures that fluidly couple the electrolysis chamber with a cathode fluid pathway that is fluidly coupled to a first electrolysis product gas collector;
    an anode associated with the electrolysis chamber opposite of the cathode at a distance from the cathode sufficient for electrolysis of the electrolysis fluid, the anode having a plurality of apertures that fluidly couple the electrolysis chamber with an anode fluid pathway that is fluidly coupled to a second electrolysis product gas collector;
    a power source electrically coupled to the cathode and anode; and
    a pump fluidly coupled with the reservoir and electrolysis chamber and configured to pump the electrolysis fluid through the reservoir,
        through the cathode apertures where electrolysis may occur, resulting first electrolysis product being pumped into the cathode fluid pathway and into the first electrolysis product gas collector; and
        through the anode apertures where electrolysis may occur, resulting second electrolysis product being pumped into the anode fluid pathway and into the second electrolysis product gas collector.

2. The electrolysis system of claim 1, wherein the pump is configured to pump the electrolysis fluid at a substantially constant flow rate.

3. The electrolysis system of claim 1, wherein the pump is configured to pump the electrolysis fluid at a variable flow rate on demand or that is preset.

4. The electrolysis system of claim 1, wherein the pump is configured to pump the electrolysis fluid in a pulsating flow pattern.

5. The electrolysis system of claim 1, wherein the electrolysis chamber does not include a membrane in the reservoir between the anode and cathode.

6. The electrolysis system of claim 1, wherein the electrolysis chamber has an inlet associated with the cathode and an inlet associated with the anode.

7. The electrolysis system of claim 1, wherein the cathode and anode are substantially parallel with respect to each other.

8. The electrolysis system of claim 1, wherein the cathode and anode have a length from about 1 cm to about 10 cm.

9. The electrolysis system of claim 1, wherein the cathode and anode have a length from about 1.0 cm to about 1.5 cm.

10. The electrolysis system of claim 1, wherein the cathode and anode are located at an electrolytic distance from each other that is from about 0.1 mm to about 15 cm.

11. The electrolysis system of claim 1, wherein the cathode and anode are located at an electrolytic distance from each other that is from about 0.5 mm to about 2 cm.

12. The electrolysis system of claim 1, wherein the electrolysis system is configured to operate to produce the first electrolysis product and the second electrolysis product in an environment lacking gravity or independent of orientation of the system with respect to gravity.

13. The electrolysis system of claim 1, wherein the apertures are included in a porous network of the cathode, the anode, or both.

14. The electrolysis system of claim 1, wherein the apertures include pores that have an average diameter ranging from about 0.00001 mm to about 3 mm.

15. The electrolysis system of claim 1, wherein the apertures include pores that have an average diameter ranging from about 0.1 mm to about 250 mm.

16. The electrolysis system of claim 1, wherein the apertures have a honeycomb configuration.

17. The electrolysis system of claim 1, wherein the apertures extend along substantially the entire length of the cathode and the anode.

18. The electrolysis system of claim 1, wherein the apertures are located at a distal end of the cathode and anode, away from the electrolysis fluid inlet.

19. The electrolysis system of claim 1, wherein the apertures narrow from the electrolysis chamber to the cathode fluid pathway and from the electrolysis chamber to the anode fluid pathway.

20. The electrolysis system of claim 1, wherein the cathode fluid pathway, the anode fluid pathway, or both have a cross-sectional width from about 0.1 mm to about 5 cm.

21. The electrolysis system of claim 1, wherein the cathode fluid pathway, the anode fluid pathway, or both have a cross-sectional width from about 2 cm to about 3 cm.

22. The electrolysis system of claim 1, wherein the electrolysis system includes a plurality of electrolysis chambers, a plurality of cathodes with apertures fluidly coupled to cathode fluid pathways, and a plurality of anodes with apertures fluidly coupled to anode fluid pathways.

23. The electrolysis system of claim 1, wherein the pump includes one or more pumps configured to push the electrolysis fluid through the electrolysis chamber through the apertures and then through the cathode and anode fluid pathways, with generated first electrolysis product and second electrolysis product, respectively.

24. The electrolysis system of claim 23, wherein the pump includes one or more pumps upstream of the electrolysis chamber.

25. The electrolysis system of claim 1, wherein the pump includes one or more pumps configured to pull the electrolysis fluid through the electrolysis chamber through the apertures and then through the cathode and anode fluid pathways.

26. The electrolysis system of claim 25, wherein the pump includes one or more pumps downstream of the electrolysis chamber.

27. The electrolysis system of claim 1, wherein the total cross sectional area of the flow path varies with distance through the electrode.

28. A method of electrolysis, the method comprising:
providing the electrolysis system of claim 1;
pumping the electrolysis fluid from the reservoir into the electrolysis chamber so as to contact the cathode and anode;
electrolyzing the electrolysis fluid to form first electrolysis product bubbles at the cathode and second electrolysis product bubbles at the anode;
passing the first electrolysis product bubbles through the cathode apertures into the cathode fluid pathway and into the first electrolysis product gas collector with the pumped electrolysis fluid; and
passing the second electrolysis product bubbles through the anode apertures into the anode fluid pathway and into the second electrolysis product gas collector with the pumped electrolysis fluid.

29. The method of claim 28, wherein the pump pumps the electrolysis fluid in a continuous flow.

30. The method of claim 28, wherein the pump is configured to pump the electrolysis fluid in a pulsating flow.

31. The method of claim 28, further comprising separating purified first electrolysis product, purified second electrolysis product, or both from the pumped electrolysis fluid and collecting the purified first electrolysis product, purified second electrolysis product, or both.

32. The method of claim 28, wherein the electrolysis system is operated in zero gravity.

33. The method of claim 28, wherein a cavity between the electrodes is agitated or mixed.

34. The method of claim 33, wherein the cavity is mixed by a shaft driven stirring device.

35. The method of claim 33, wherein the cavity is mixed by guide vanes that initiate mixing.

36. The method of claim 33, wherein the cavity is mixed by external magnetic fields that rotate a magnetic stir bar to cause mixing.

* * * * *